United States Patent [19]

Uchida

[11] Patent Number: 5,778,734
[45] Date of Patent: Jul. 14, 1998

[54] FASTENING STRUCTURE

[75] Inventor: Terumune Uchida, Toyota, Japan

[73] Assignee: Toyota Jidosha Kabushiki Kaisha, Toyota, Japan

[21] Appl. No.: 610,343

[22] Filed: Mar. 4, 1996

[30] Foreign Application Priority Data

Apr. 12, 1995 [JP] Japan .................................. 7-112336

[51] Int. Cl.$^6$ ...................................................... B62D 1/04
[52] U.S. Cl. ............................... 74/552; 403/261; 403/358
[58] Field of Search .............................. 74/484 R, 485, 74/558.5, 563, 608; 403/261, 358

[56] References Cited

U.S. PATENT DOCUMENTS

| | | | |
|---|---|---|---|
| 3,236,487 | 2/1966 | Chakeres | 248/244 |
| 3,841,774 | 10/1974 | Maxey | 403/358 |
| 3,867,871 | 2/1975 | Shore | 403/261 |
| 4,411,331 | 10/1983 | Hanada | 74/492 |
| 4,607,539 | 8/1986 | Arima et al. | 74/492 |
| 4,627,522 | 12/1986 | Ulrich et al. | 74/484 R X |
| 4,759,654 | 7/1988 | Martin et al. | 403/387 |
| 4,899,612 | 2/1990 | Bruhnke et al. | 74/493 |
| 5,426,993 | 6/1995 | Bodo | 74/484 R |

FOREIGN PATENT DOCUMENTS

| | | | |
|---|---|---|---|
| 1019878 | 1/1953 | France | 74/484 R |
| 61-190021 U | 11/1986 | Japan . | |
| 164640 | 6/1956 | Sweden | 74/484 R |

OTHER PUBLICATIONS

JIS B 0143—Symbols and Designations of Dimensions for Threaded Fasteners.
Automotive Engineering Case Book, p. 108, Issue No. 93800, Publication date: Jan. 10, 1994.

*Primary Examiner*—Vinh T. Luong
*Attorney, Agent, or Firm*—Oliff & Berridge, PLC.

[57] ABSTRACT

An upper cover (12) and a lower cover (14) are fastened to each other on their front faces by a hexagon socket head cap screw (40). While a cover supporting column (34) is received on a column seat (38) of each fixation tongue (30) projected from the upper cover (12), the end face of the cover supporting column (34) is brought into contact with a column contact surface (36) of the fixation tongue (30). The hexagon socket head cap screw (40) is inserted through a spot facing slot (60) and a through slot (58) of the lower cover (14) and a through hole (48) of the upper cover (12) and eventually screwed into a tapped hole (42) of the cover supporting column (34). The cover supporting column (34) and the fixation tongue (30) of the upper cover (12) are positioned and fixed to each other via the hexagon socket head cap screw (40), which goes through the positioning through hole (48) of the fixation tongue (30) and is screwed into the tapped hole (42). In response to the screwing process of the hexagon socket head cap screw (40), the lower cover (14) slides along a first slope (46) of the fixation tongue (30) until a contact surface (50) of the lower cover (14) comes into contact with a positioning seat surface (44) of the upper cover (12).

8 Claims, 6 Drawing Sheets

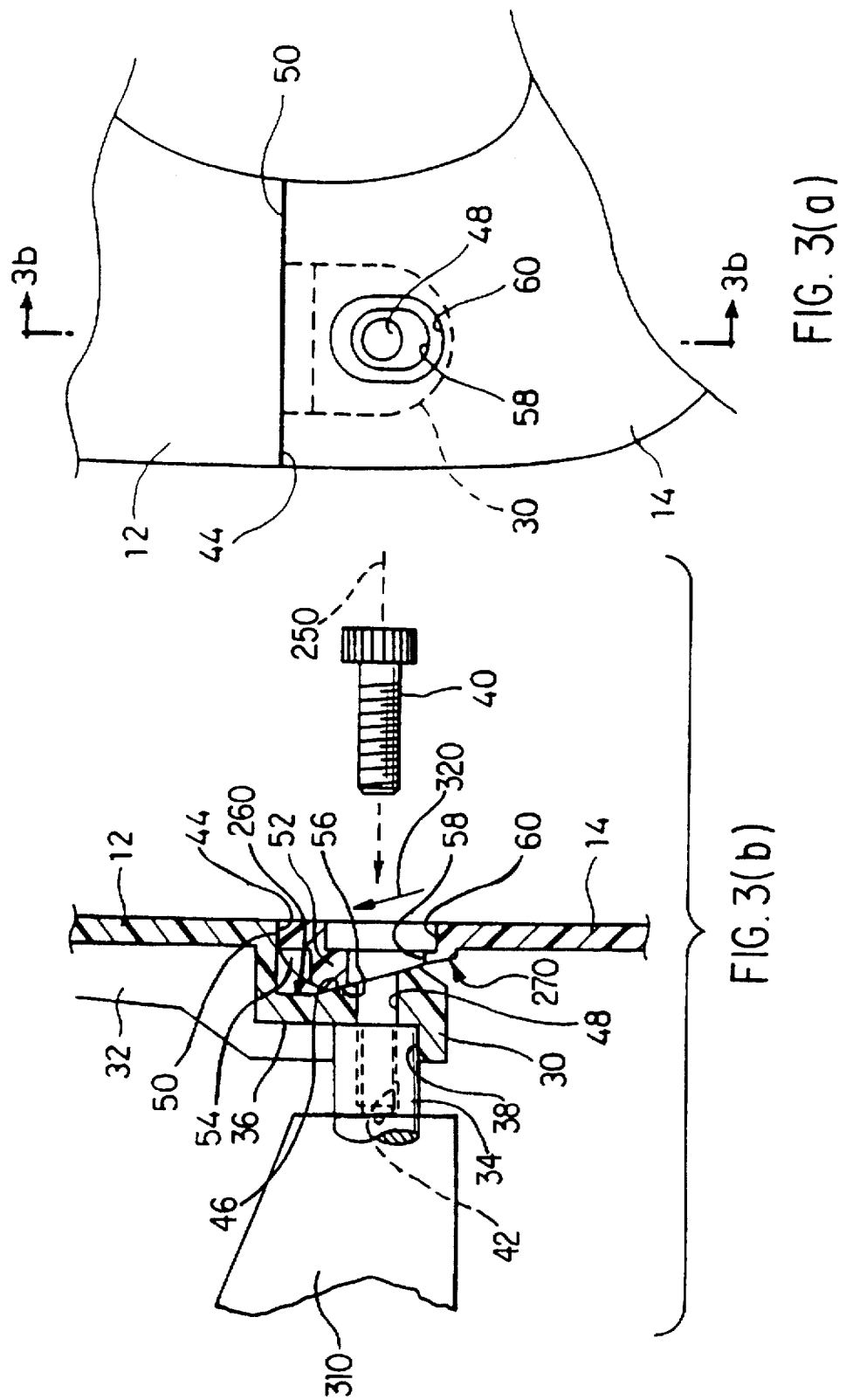

1

FASTENING STRUCTURE

BACKGROUND OF THE INVENTION

1. Field of the Invention

The present invention relates to a fastening structure, in which a first member and a second member are fastened to each other by means of a externally threaded fastener, such as a bolt or a tapping screw.

2. Description of Related Art

A variety of techniques have been proposed for the conventional fastening structures including two different members fastened together with bolts. For example, in the fastening structure disclosed in JAPANESE PATENT LAID-OPEN GAZETTE No. 61-190021, matching surfaces of a washer and one of the two members opposed to the washer are formed as slopes inclined against the axis of a bolt. Two through holes formed in the slopes of the washer and the washer-facing member for receiving the bolt have a diameter greater than the diameter of the external thread of the bolt. This technique can produce a force in a direction perpendicular to the axis along the slope in the process of screwing the bolt. The slopes also exert the wedge-like effect. This effectively prevents the fastened members from being slipped against the bolt.

The conventional fastening structure, however, has the following disadvantages. In the fastening process, the member opposed to the washer is naturally shifted along the slope until the bolt shank hits against the inner walls of the through holes. The relative position of the washer-facing member to the other member depends upon the degree of shift of the washer-facing member along the slope. The relative position is fixed only when the bolt shank hits against the inner walls of the through holes. Since the bolt shank and the through hole of the washer-facing member are blocked by the other member, neither is observable from the fastening side. It is accordingly rather difficult to confirm that the bolt shank hits the inner walls of the through holes. In the known fastening structure, the user is required to look into the rear side of the member via the washer or touch the bolt shank with fingers in order to check the position of the bolt shank in the fastening process. This requires much labor of the user. When the user checks the position of the bolt shank by touching the shank with fingers, the user often can not tell the exact positions on the inner walls of the through holes, which the bolt shank hits against.

In an example of FIG. 7, although a bolt shank 100 hits against inner walls of through holes 108 and 106 of a washer 104 and a washer-facing member 102, the hit positions on the inner walls are not aligned. In such a case, the relative position of the washer 104 to the washer-facing member 102 is varied as shown by the two-dot chain line in FIG. 7. The position of the other member (not shown), which is to be fastened to the washer-facing member 102, is fixed with respect to the bolt shaft 100 fitted in the other member. Because of the varied relative position of the washer 104 to the washer-facing member 102, however, the relative positions of the other member to the washer 104 and the washer-facing member 102 are undesirably varied.

Specific problems arise when two members (the washer-facing member 102 and the other member) are simply joined and fastened together even under the condition of varied relative positions. Misadjustment of the relative positions of the fastened members, for example, causes misalignment of end faces of the two members, thereby damaging the design effect.

SUMMARY OF THE INVENTION

The object of the present invention is thus to improve the precision of positioning when two different members are fastened together by means of bolts.

The above and other related objects are realized by a fastening structure including a first member and a second member separated from each other, the first member having a first face facing the second member, the second member having a second face facing the first member;

an externally threaded fastener for fastening the first and second members, the externally threaded fastener having a male screw thread around an axis of said externally threaded fastener. In the fastening structure of the invention, the first member includes:

first combinating part having a first through hole, through which the externally threaded fastener passes, and a first slope formed on the first face of the first member, the first slope being inclined against the axis, the first through hole being arranged to position the externally threaded fastener passing there through; and first positioning part for positioning the second member when the first member and the second member move relative to each other along the first slope;

the second member including:

second combinating part having a second through hole, through which the externally threaded fastener passes, and a second slope formed on the second face of the second member, the second slope being arranged to contact with the first slope, the second through hole having play in a direction perpendicular to the axis to allow movement of the externally threaded fastener passing there through; and contact structure for coming into contact with the first positioning part when the first member and the second member move relative to each other along the first slope.

Examples of the externally threaded fastener include hexagonal headed bolts, hexagon socket head cap screws, tapping screws, and other screws fastened with screwdrivers having a Phillips head tip or keystone tip as explained in JIS B 0143.

In the fastening structure of the present invention, in the process of fastening the first member and the second member together by means of the externally threaded fastener, the externally threaded fastener is inserted through the second through hole of the second combinating part of the second member and the first through hole of the first combinating part of the first member. The first through hole works to position the externally threaded fastener, so that the relative position of the first member to the externally threaded fastener is fixed via the externally threaded fastener inserted into the first through hole.

Application of a clamping force of the externally threaded fastener enables the first slope formed on the first face of the first combinating part of the first member to be adjoining to the second slope formed on the second face of the second combinating part of the second member. Since the first slope is inclined against the axis of the externally threaded fastener, the first member and the second member relatively move along the first slope in a direction perpendicular to the axis of the externally threaded fastener in the range of play of the second through hole to allow movement of the externally threaded fastener. The contact structure of the second member eventually comes into contact with the first positioning part of the first member. This interferes with further movement of the second member along the first slope and positions the second member relative to the first member in the direction perpendicular to the axis of the externally threaded fastener. The relative position of the second member to the first member is fixed through the contact of the contact means with the first positioning part. In this manner, the fastening structure of the invention effectively fixes the relative position of the first member to the externally threaded fastener as well as the relative position of the second member to the first member. This structure preferably improves the precision of positioning when the first member and the second member are fastened together by means of the externally threaded fastener.

In accordance with one preferable application of the described arrangement, the first positioning part of the first member positions the second member in the direction perpendicular to the axis of the externally threaded fastener. This simplifies the orientation of the first positioning part with respect to the externally threaded fastener.

In one aspect of the invention, the first through hole has a female tapped hole, into which the male screw thread on the externally threaded fastener is screwed. This arrangement easily accomplishes the fixation of the first member to the second member with a high precision of positioning simply by screwing the externally threaded fastener into the first through hole.

In another aspect of the invention, the externally threaded fastener has a tapping screw whereas the first through hole has a prepared hole for the tapping screw. The tapping screw forms a screw thread in the first through hole and is screwed into the first member while the second member moves as discussed above. This arrangement also ensures the fixation of the first member to the second member with a high precision of positioning.

In accordance with one preferable embodiment of the invention, the fastening structure further includes a third member disposed proximate to one of the first member and the second member and having a female tapped hole, into which the male screw thread on the externally threaded fastener passing through the first member and the second member is screwed.

In this structure, the externally threaded fastener is inserted from either the first through hole or the second through hole to pass through both the first and the second through holes and screwed into the female tapped hole of the third member. The first through hole works to position the externally threaded fastener, so that the relative position of the first member to the third member is fixed via the externally threaded fastener inserted through the positioning first through hole and screwed into the third member.

Screwing the externally threaded fastener into the third member enables the first slope of the first member to be adjoining to the second slope of the second member. Since the first slope is inclined against the axis of the externally threaded fastener, the second member moves along the first slope in the direction perpendicular to the axis of the externally threaded fastener in the range of play of the second through hole to allow movement of the externally threaded fastener. The contact structure of the second member eventually comes into contact with the first positioning part of the first member. This interferes with further movement of the second member along the first slope and positions the second member relative to the first member in the direction perpendicular to the axis of the externally threaded fastener. The relative position of the second member to the first member is fixed through the contact of the contact means with the first positioning part. In this manner, the arrangement of the preferable embodiment effectively fixes the relative positions of the first member to the second member and the third member.

In a modified application of this arrangement, it is preferable that the first member is further provided with second positioning part for positioning the third member disposed proximate to the first member in order to dispose the first through hole substantially concentrical with the female tapped hole.

In the modified structure, the second positioning part realizes the substantially concentrical arrangement of the first through hole with the female tapped hole prior to the screwing process of the externally threaded fastener. The concentrical arrangement roughly positions the first member and the third member in the beginning of the screwing process of the externally threaded fastener. The modified fastening structure enables the externally threaded fastener inserted into the first through hole to be immediately guided to and screwed into the observable, connecting female tapped hole. This effectively improves the working efficiency.

In accordance with preferable embodiments of the invention, the third member may have a nut or more specifically a cap nut. Using a cap nut as the third member has the following advantage. By way of example, a cap nut is exposed to a design surface of a product, and the first member and the second member are fastened together by means of the cap nut and the externally threaded fastener. The principle of the present invention is favorably applicable to this example and enables the first member and the second member to be fixed to the cap nut exposed to the design surface with a high precision of positioning, thereby not damaging the design effect.

In another preferable embodiment of the invention, the third member includes a support member, mounted on an external fixed structure, for supporting the first member and the second member. This structure enables the first member and the second member to be fixed to the fixed structure with a high precision of positioning.

In a preferred application of the invention, the third member is a cover supporting column fixed to a steering column of a vehicle, and the first member and the second member constitute a column cover for covering the steering column. The structure of the invention enables the steering column in the vehicle to be effectively covered with the column cover consisting of the first member and the second member with a high precision of positioning according to the simplified process of assembly.

These and other objects, features, aspects, and advantages of the present invention will become more apparent from the following detailed description of the preferred embodiment with the accompanying drawings.

BRIEF DESCRIPTION OF THE DRAWINGS

FIG. 3a shows a relevant part of the front faces of the covers 12 and 14;

FIG. 3b is a cross sectional view illustrating a fixation mechanism of the relevant part, taken on the line 3b—3b of FIG. 3a;

DESCRIPTION OF THE PREFERRED EMBODIMENT

In a preferred embodiment described below, the fastening structure of the present invention is applied to a column cover for covering a steering column in a vehicle.

Figure 1:
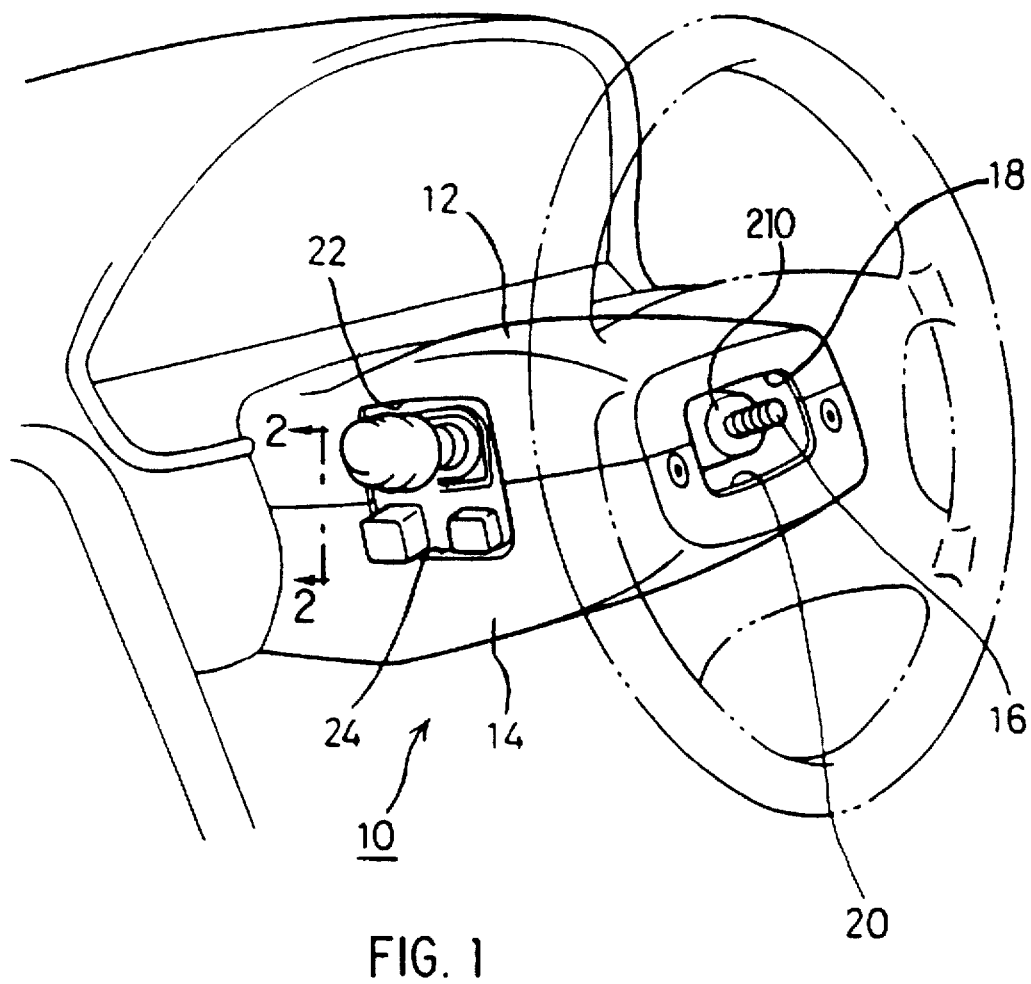
FIG. 1 is a perspective view schematically illustrating is a steering column and its surroundings in a vehicle.

FIG. 1 is a perspective view schematically illustrating a steering column 210 and its surroundings in a vehicle. A column cover 10 includes an upper cover (first member) 12 and a lower cover (second member) 14, which are joined with each other along their matching lines. The upper cover 12 and the lower cover 14 respectively have front notches 18 and 20, which surround a steering shaft 16 projected from a combination switch (not shown). The upper cover 12 and the lower cover 14 also have side notches 22 and 24, which surround a tilt lever and a telescopic switch for a steering wheel and other switches. The side notches 22 and 24 may not be found in some types of vehicles but are not essential for the invention or this embodiment.

In the process of joining the upper cover 12 and the lower cover 14 with each other, misadjustment of the matching lines of the covers 12 and 14 results in the misaligned front notches 18 and 20 or the misaligned side notches 22 and 24 and thereby damages the design of the column cover 10. In order to prevent such a misalignment, the column cover 10 is constructed as discussed below.

Figure 2:
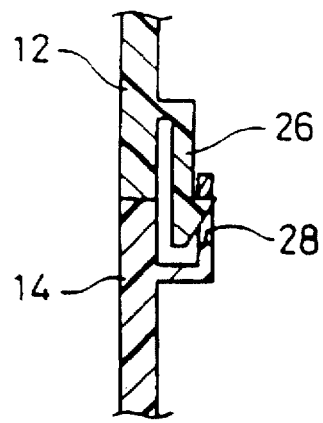
FIG. 2 is a cross sectional view along section 2—2 of FIG. 1 illustrating a fixation mechanism for fixing an upper cover 12 and a lower cover 14 to each other on the side faces thereof, through an engagement of an engagement hook 26 with an engagement eye 28.
Figure 7A:
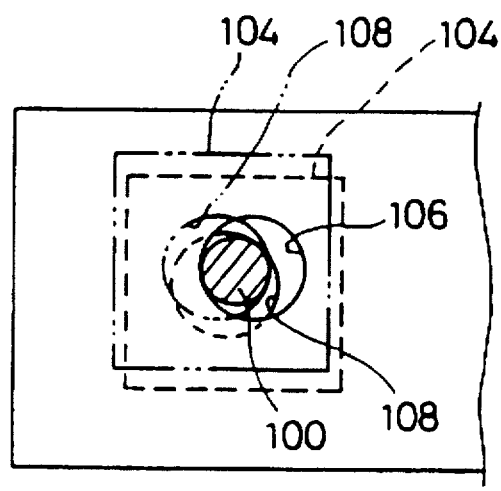
Figure 7B:
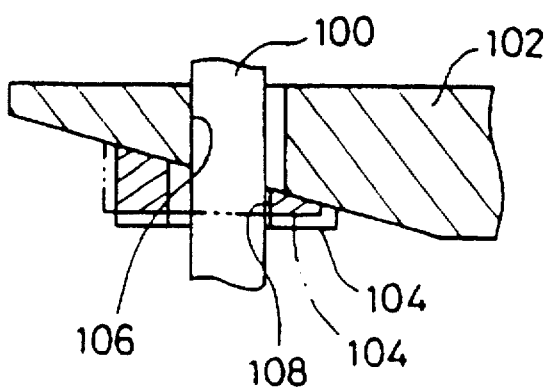

The side faces of the upper cover 12 and the lower cover 14 are exposed to the interior of the vehicle as clearly seen in FIG. 1. The covers 12 and 14 are joined with and fixed to each other at an un-observable position inside the side faces thereof. Referring to FIG. 2, an engagement hook 26 disposed on the side wall of the upper cover 12 is fitted in an engagement eye 28 disposed on the side wall of the lower cover 14, so that the upper cover 12 and the lower cover 14 are fixed to each other along the matching lines thereof.

Figure 3C:
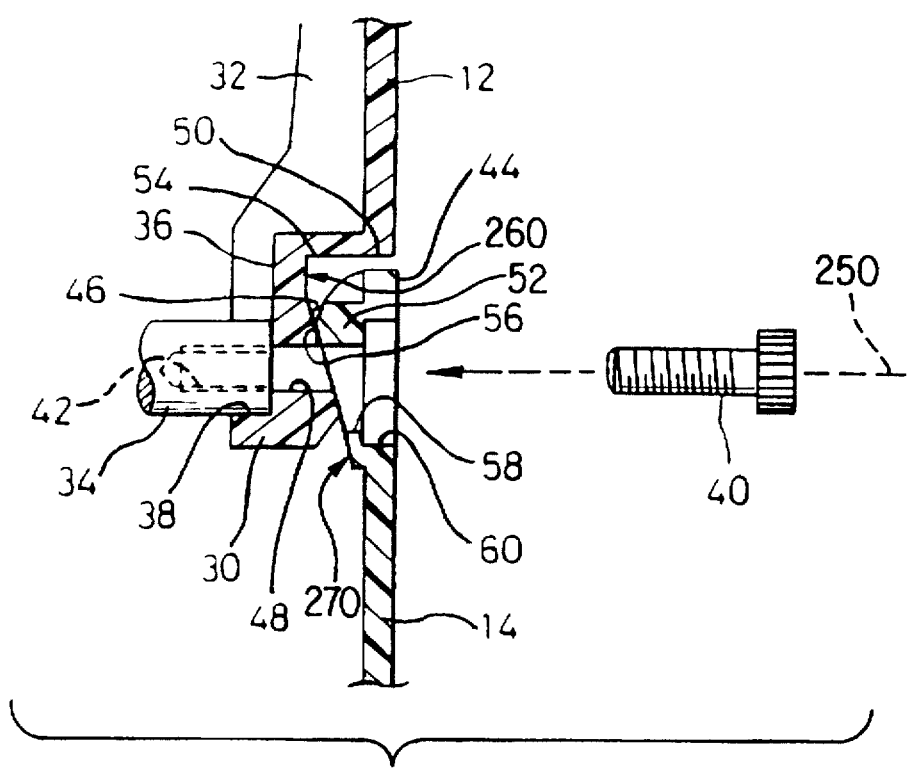
FIG. 3(c) shows the fixation mechanism of FIG. 3(b) in a moved position.

The front faces of the upper cover 12 and the lower cover 14 are mostly hidden by a steering boss and are attached to a cover supporting column of the steering column. A bolt mechanism is generally applied for the fixation of the covers 12 and 14 to each other on the front faces thereof. FIG. 3a shows a relevant part of the front faces of the covers 12 and 14, and FIG. 3b is a cross sectional view illustrating a fixation mechanism of the relevant part, taken on the line 3b—3b of FIG. 3a. The upper cover 12 is provided with a pair of fixation tongues 30 (only one shown in FIGS. 3a and 3b) projected from the lower end of the front face thereof. Each fixation tongue 30 is reinforced and supported by cover 14. The rear face of each fixation tongue 30 forms a column contact surface 36, which comes into contact with an end face of a cover supporting column (support member) 34 attached to the steering column (external fixed structure) 310. The lower end of the fixation tongue 30 is bent to form a column seat (third contact part) 38 for receiving and supporting the circumference of the end face of the cover supporting column 34. The column seat 38 is formed in an arc shape having a diameter substantially identical with the outer diameter of the cover supporting column 34. The column seat 38 is formed to accomplish a substantially concentrical arrangement of a tapped hole 42 of the cover supporting column 34 with a through hole (first through hole) 48 formed in the fixation tongue 30 when the cover supporting column 34 is received on the column seat 38.

The base portion of the fixation tongue 30 and the lower end of the upper cover 12 form a positioning seat surface (first contact part) 44. The positioning seat surface 44 is arranged to be parallel to the axis 250 of a hexagon socket head cap screw (externally threaded fastener) 40, which is screwed into the tapped hole 42 of the cover supporting column 34. A front faces 260 of the fixation tongue 30 of the upper cover 12 extended over the upper end of the lower cover 14 includes a first slope 46, which is inclined against the axis 250 of the hexagon socket head cap screw 40. The through hole 48 formed in the fixation tongue 30 passes through the first slope 46. The through hole 48 has a diameter a little greater than the nominal diameter of the external thread of the hexagon socket head cap screw 40, and functions to position the hexagon socket head cap screw 40 inserted therein.

The upper end of the lower cover 14 forms a contact surface (second contact part) 50, which is brought into contact with the positioning seat surface 44 of the upper cover 12. The lower cover 14 is provided with a pair of projections 52 (only one shown in FIG. 3b) formed on the rear face thereof. Each projection 52 is reinforced by a rib 54 and positioned to face each fixation tongue 30. Part of the rear face 270 of the projection 52 forms a second slope 56, which is adjoining to the first slope 46 of the fixation tongue 30. The projection 52 has an oblong through slot (second through hole) 58 passing through the second slope 56. The through slot 58 runs in a direction substantially perpendicular to the axis 250 of the hexagon socket head cap screw 40 screwed into the tapped hole 42 of the cover supporting column 34, the positioning seat surface 44 of the upper cover, and the contact surface 50 of the lower cover 14. The structure of the through slot 58 enables the lower cover 14 to move relative to the hexagon socket head cap screw 40. A spot facing slot 60 is formed in the lower cover 14 to surround the through slot 58. The head of the hexagon socket head cap screw 40 is received in the spot facing slot 60.

The upper cover 12 and the lower cover 14 thus constructed are fixed to each other on the front faces thereof as discussed below. The cover supporting column 34 is received and supported by the column seat 38 of the fixation tongue 30 while the end face of the cover supporting column 34 is brought into contact with the column contact surface 36. The relative positions of the upper cover 12 and the lower cover 14 to the cover supporting column 34 are determined to allow the first slope 46 of each fixation tongue 30 to face the second slope 56 of each projection 52. The hexagon socket head cap screw 40 is inserted through the spot facing slot 60 and the through slot 58 of the lower cover 14 and the through hole 48 of the upper cover 12 and eventually screwed into the tapped hole 42 of the cover supporting column 34. Since the through hole 48 of the fixation tongue 30 is arranged to be substantially concentrical with the tapped hole 42 of the cover supporting column 34 by the column seat 38 as described previously, the hexagon socket head cap screw 40 inserted into the through hole 48 is guided to the tapped hole 42.

The clamping force of the hexagon socket head cap screw 40 screwed into the tapped hole 42 enables the first slope 46 of the fixation tongue 30 to be adjoining to the second slope 56 of the projection 52. Further screwing of the hexagon socket head cap screw 40 into the tapped hole 42 applies a force acting along the first slope 46 and the second slope 56 to the lower cover 14. The lower cover 14 accordingly slides along the first slope 46 of the fixation tongue 30 projected from the upper cover 12 and moves towards the positioning seat surface 44 of the upper cover 12. The contact surface 50 of the lower cover 14 eventually comes into contact with the positioning seat surface 44 of the upper cover 12. This prevents the lower cover 14 from being further moved along the first slope 46 (in a first direction 320) and positions the lower cover 14 against the upper cover 12. The lower cover 14 thus positioned is fastened with the cover supporting column 34 and the upper cover 12.

The cover supporting column 34 and the fixation tongue 30 are positioned and fixed to each other via the hexagon socket head cap screw 40, which goes through the positioning through hole 48 of the fixation tongue 30 and is screwed into the tapped hole 42. The cover supporting column 34, the upper cover 12, and the lower cover 14, whose relative positions are fixed as discussed above, are fastened by means of the hexagon socket head cap screw 40. The structure of the embodiment effectively improves the precision of positioning in the process of fastening the upper cover 12 and the lower cover 14.

Even when the pre-clamping arrangement of the lower cover 14 is a little deviated from the matching line of the upper cover 12, the clamping force of the hexagon socket head cap screw 40 can position and fix the lower cover 14 at a high precision and improves the working properties. The hexagon socket head cap screw 40 can be screwed into the tapped hole 42 with an appropriate clamping force, while the state of the contact surface 50 in contact with the positioning seat surface 44 is observed. This structure of the embodiment enables the lower cover 14 to be easily positioned and fastened without causing excessive clamping of the hexagon socket head cap screw 40, thereby further improving the working properties.

As described previously, the column seat 38 accomplishes the substantially concentrical arrangement of the through hole 48 of the fixation tongue 30 with the tapped hole 42 of the cover supporting column 34. The concentrical arrangement roughly positions the upper cover 12 and the cover supporting column 34 in the beginning of the screwing process of the hexagon socket head cap screw 40. The fastening structure of the embodiment enables the hexagon socket head cap screw 40 inserted into the through hole 48 to be immediately guided to and screwed into the observable, connecting tapped hole 42. This effectively improves the working efficiency.

The upper cover 12 and the lower cover 14 are fastened to each other while the positioning seat 44 of the upper cover 12 is in contact with the contact surface 50 of the lower cover 14. This structure effectively prevents the upper cover 12 and the lower cover 14 from producing a twanging sound due to the high-frequency vibration of the body propagated to the covers 12 and 14.

There may be many modifications, alternations, and changes without departing from the scope or spirit of essential characteristics of the invention. It is thus clearly understood that the above embodiment is only illustrative and not restrictive in any sense. Some examples of modification are given below.

The fastening structure of the above embodiment is provided with the column seat 38, which accomplishes the substantially concentrical arrangement of the through hole 48 of the fixation tongue 30 with the tapped screw 42 of the cover supporting column 34. The fixation tongue 30 may, however, have another structure without the column seat 38 on the lower end thereof.

Figure 4:
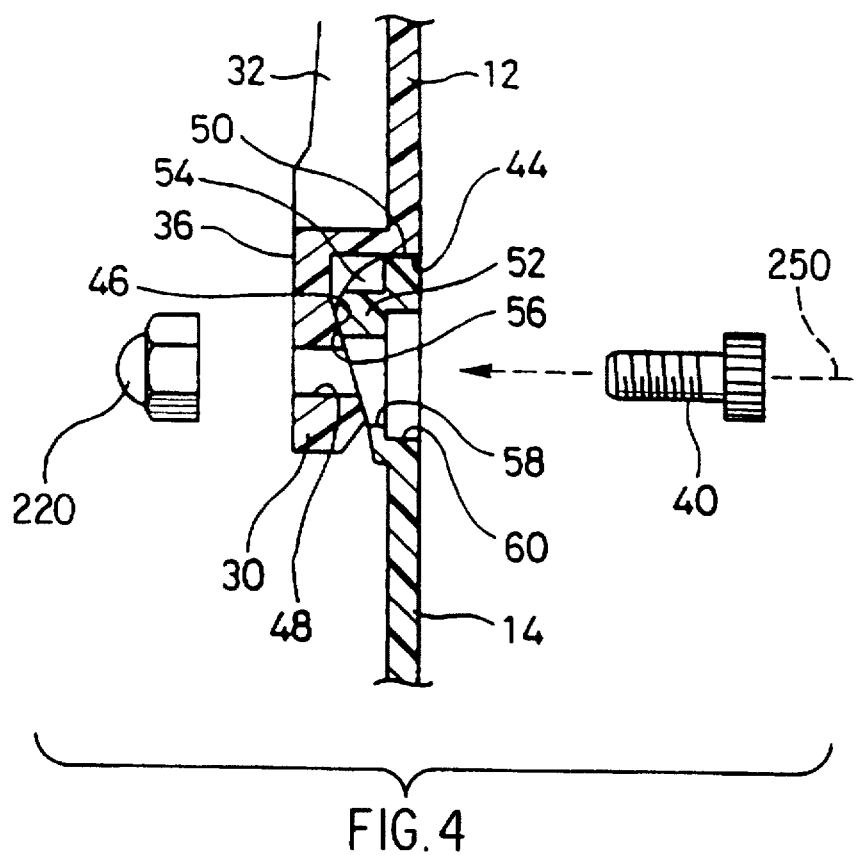
FIG. 4 shows a modified structure using a cap nut in place of the cover supporting column 34 of the embodiment.

Although the fastening structure of the invention is applied to the column cover 10 for covering the steering column in the above embodiment, the same structure may be applied to other covers and vessels. The hexagon socket head cap screw 40 may be clamped to a separate member, instead of the fixed member (the cover supporting column 34 fixed to the steering column 310 in the above embodiment). This is applied to the case that the column contact surface 36 of the fixation tongue 30 forms an observable design surface of a product and that the hexagon socket head cap screw 40 is clamped to a cap nut instead of the cover supporting column 34. By way of example, the cap nut exposed to the design surface is located on the substantial center of the column contact surface 36 and the upper cover 12 and the lower cover 14 joined along their matching lines are exposed with the pair of fixation tongues 30 to form a specific design. The principle of the invention is favorably applicable to such structure using the cap nut 220 in place of the cover supporting column 34 as shown in FIG. 4, and effectively improves the precision of positioning of each element to protect the design effect.

Although the hexagon socket head cap screw 40 is screwed first to the lower cover 14 in the above embodiment, it may be screwed first to the upper cover 12. In the latter case, the through slot 58 and the spot facing slot 60 are formed in the fixation tongue 30 of the upper cover 12, whereas the through hole 48 is formed in the projection 52 of the lower cover 14.

Figure 5:
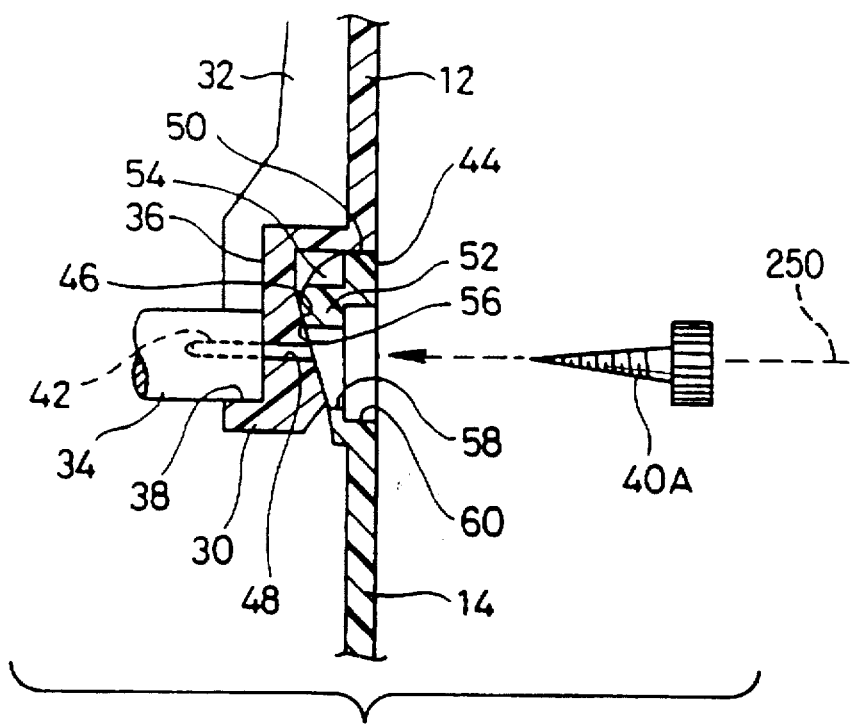
FIG. 5 shows another modified structure using a tapping screw 40A in place of the hexagon socket head cap screw 40 of the embodiment.

Instead of the hexagon socket head cap screw 40, a tapping screw 40A may be used for fastening the upper cover 12 and the lower cover 14 as shown in FIG. 5. In this structure, the through hole 48 is formed as a prepared hole of the tapping screw 40A, and either a prepared hole or a center hole is formed in the cover supporting column 34. The prepared hole has a diameter a little smaller than the outer diameter of the tapping screw 40A.

Figure 6:
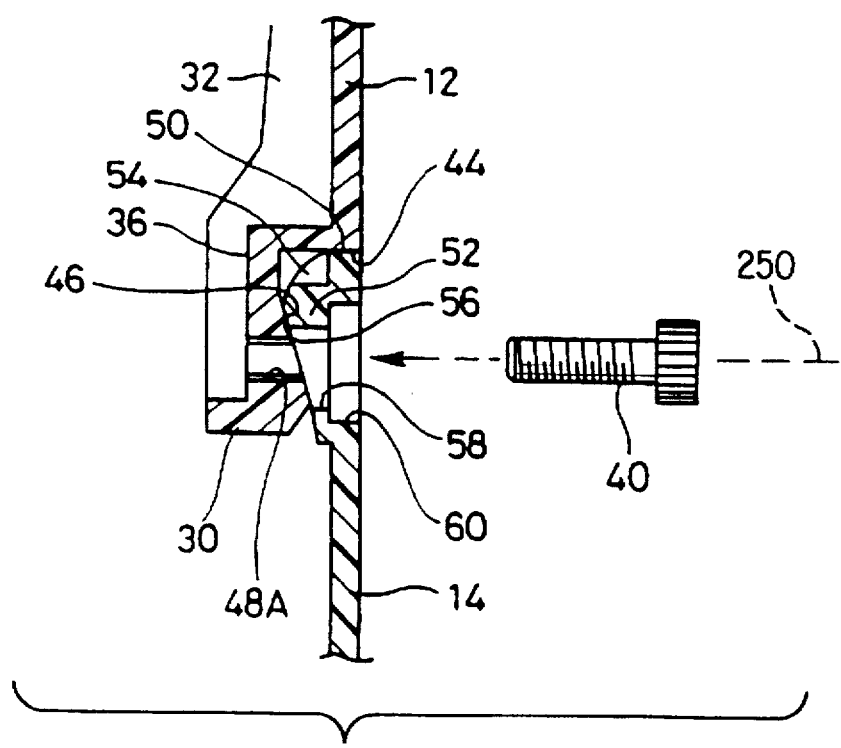
FIG. 6 shows still another modified structure, in which a externally threaded fastener, such as the hexagon socket head cap screw 40, is screwed into a female tapped hole 48A formed instead of the through hole 48 of the embodiment; and FIG. 7a and FIG. 7b illustrates a conventional fastening structure with problems to be solved.

In another modified structure shown in FIG. 6, a externally threaded fastener, such as the hexagon socket head cap screw 40, is screwed into a female tapped hole 48A, which is formed instead of the through hole 48. In the above embodiment, the upper cover 12 has the positioning seat surface 44 while the lower cover 14 has the contact surface 50. This structure may be inverted; that is, the upper cover 12 has a contact surface and the lower cover 14 has a positioning seat surface.

The scope and spirit of the present invention are limited only by the terms of the appended claims.

What is claimed is:

1. A fastening structure comprising:
   a first member;
   a second member distinct from said first member;
   an externally threaded fastener for fastening said first and second members, said externally threaded fastener having a male screw thread around an axis of said externally threaded fastener;
   a third member disposed proximate to one of said first member and said second member and having a female tapped hole, into which the male screw thread on said externally threaded fastener passing through said first member and said second member is screwed;
   said first member further comprising:
   a first face facing said second member,
   a first through hole, through which said externally threaded fastener passes, said first through hole being arranged to position said externally threaded fastener passing therethrough, a first slope formed on said first face of said first member, said first slope being inclined against said axis, and
a first contact part;
said second member further comprising:
a second face facing said first member,
a second through hole, through which said externally threaded fastener passes, said second through hole having play in a direction perpendicular to said axis to allow movement of said externally threaded fastener passing therethrough,
a second slope formed on said second face of said second member, said second slope being arranged to contact said first slope, and
a second contact part;
wherein the first and second contact parts of the first and second members are arranged so that contact between the first and second contact parts prevents movement of the first member relative to the second member along the first slope in a first direction.

2. A fastening structure in accordance with claim 1, wherein said first member further comprises a third contact part for positioning said third member disposed proximate to said first member in order to dispose said first through hole substantially concentrical with said female tapped hole.

3. A fastening structure in accordance with claim 2, wherein said third member comprises a support member and an external fixed structure, wherein the support member is mounted on the external fixed structure and supports said first member and said second member.

4. A fastening structure in accordance with claim 3, wherein the support member is a cover supporting column and the external fixed structure is a steering column of a vehicle, and said first member and said second member constitute a column cover for covering said steering column.

5. A fastening structure in accordance with claim 1, wherein said first through hole has a female tapped hole, into which the male screw thread on said externally threaded fastener is screwed.

6. A fastening structure in accordance with claim 1, wherein said externally threaded fastener has a tapping screw, and said first through hole has a prepared hole for said tapping screw.

7. A fastening structure in accordance with claim 1, wherein said third member has a nut.

8. A fastening structure in accordance with claim 1, wherein said third member has a cap nut.

* * * * *